United States Patent
Osseforth

(10) Patent No.: US 12,080,437 B2
(45) Date of Patent: Sep. 3, 2024

(54) METHOD AND ASSEMBLING SYSTEM FOR INSERTING AT LEAST ONE NUCLEAR FUEL ROD INTO SPACER GRIDS OF A NUCLEAR FUEL ASSEMBLY

(71) Applicant: FRAMATOME, Courbevoie (FR)

(72) Inventor: Ewald Osseforth, Wietmarschen (DE)

(73) Assignee: FRAMATOME, Courbevoie (FR)

( * ) Notice: Subject to any disclaimer, the term of this patent is extended or adjusted under 35 U.S.C. 154(b) by 476 days.

(21) Appl. No.: 17/311,988

(22) PCT Filed: Dec. 12, 2019

(86) PCT No.: PCT/EP2019/084784
§ 371 (c)(1),
(2) Date: Jun. 8, 2021

(87) PCT Pub. No.: WO2020/120648
PCT Pub. Date: Jun. 18, 2020

(65) Prior Publication Data
US 2022/0059245 A1 Feb. 24, 2022

(30) Foreign Application Priority Data
Dec. 14, 2018 (EP) .................................. 18306696

(51) Int. Cl.
*G21C 3/334* (2006.01)
*F16N 15/00* (2006.01)
(Continued)

(52) U.S. Cl.
CPC ............. *G21C 3/334* (2013.01); *F16N 15/00* (2013.01); *F16N 25/00* (2013.01); *F16N 31/00* (2013.01); *F16N 39/04* (2013.01)

(58) Field of Classification Search
CPC ......... G21C 3/334; B05B 16/90; F16N 15/00; F16N 15/04; F16N 7/32
See application file for complete search history.

(56) References Cited

U.S. PATENT DOCUMENTS

| 3,757,403 A | 9/1973 | Bleiberg |
| 4,653,180 A * | 3/1987 | Le Pargneux ......... G21C 3/334 376/463 |

(Continued)

FOREIGN PATENT DOCUMENTS

JP S5639483 A 4/1981

OTHER PUBLICATIONS

Corresponding Search Report for PCT/EP2019/084784.
Corresponding Search Report for EP18306696.

*Primary Examiner* — Sharon M Davis
(74) *Attorney, Agent, or Firm* — Davidson Kappel LLC

(57) ABSTRACT

A method comprises inserting the fuel rod (4) through the spacer grids (14) aligned along an assembling axis (A) with passing the fuel rod (4) through a lubrication chamber (30) aligned with the spacer grids (14) such that the lubrication chamber (30) is passed through by the fuel rod (4) before the insertion of the fuel rod (4) through one of the spacer grids (14), and circulating a lubrication fluid containing a gas and a lubricant in gaseous phase and/or mist form in the lubrication chamber (30). The lubrication fluid is injected in the lubrication chamber (30) at a temperature strictly higher than ambient temperature, such that lubricant deposits or condensates in liquid phase with forming a lubricant film on an external surface of the fuel rod (4) that is being inserted through said one of the spacer grids (14).

16 Claims, 3 Drawing Sheets

(51) Int. Cl.
  *F16N 25/00* (2006.01)
  *F16N 31/00* (2006.01)
  *F16N 39/04* (2006.01)

(56) References Cited

U.S. PATENT DOCUMENTS

| | | | |
|---|---|---|---|
| 5,028,382 A | 7/1991 | King, Jr. et al. | |
| 5,318,152 A * | 6/1994 | Ehlert | F16N 39/002 |
| | | | 184/104.1 |
| 5,746,259 A * | 5/1998 | Noble, III | F01P 11/0204 |
| | | | 165/95 |
| 2011/0150163 A1* | 6/2011 | Bausch | G21C 21/02 |
| | | | 376/267 |
| 2013/0126274 A1* | 5/2013 | Foret | F01M 1/12 |
| | | | 184/14 |

* cited by examiner

METHOD AND ASSEMBLING SYSTEM FOR INSERTING AT LEAST ONE NUCLEAR FUEL ROD INTO SPACER GRIDS OF A NUCLEAR FUEL ASSEMBLY

The present disclosure relates to a method and assembling system for inserting at least one nuclear fuel rod into spacer grids of a nuclear fuel assembly.

BACKGROUND

A nuclear reactor comprises a reactor core made of a plurality of nuclear fuel assemblies arranged side-by-side.

Each fuel assembly comprises a bundle of parallel nuclear fuel rods extending along a fuel assembly axis and an armature supporting the fuel rods.

Each fuel rod generally comprises a tubular fuel rod cladding encasing fissile material, the fissile material being provided e.g. in the form of fuel pellets stacked into the tubular cladding.

The armature notably comprises a plurality of spacer grids distributed along the bundle of fuel rods, each spacer grid being configured for supporting the fuel rods along the assembly axis and transversely to the assembly axis, in a spaced relationship.

Each spacer grid comprises a lattice of cells comprising tube cells and fuel rod cells, each fuel rod cell receiving a respective fuel rod of the bundle of fuel rods. Each fuel rod cell of the spacer grid is provided with supporting features located for instance on one or several of the lateral walls of the fuel rod cell, e.g. one or several flexible spring(s) and/or one or several rigid dimple(s).

In view of mounting the fuel rods into the armature, it is possible to rigidly attach the armature onto an assembling bench or station, the spacer grids being aligned in an insertion direction, each spacer grid extending perpendicular to the insertion direction, and to insert each fuel rod through the spacer grids along the insertion direction.

However, insertion of a fuel rod through a spacer grid may lead to scratching the fuel rod cladding by contact with the supporting features of the fuel rod cell receiving the fuel rod, and to possible burrs building up by accumulation of scratches into a contact area between the fuel rod and a supporting feature of the spacer grid.

It is possible to lubricate a fuel rod for the insertion of the fuel rod through the spacer grids, in view of limiting friction forces and preventing formation of scratches.

If the lubricant is not water, the lubricant has to be removed before insertion of the nuclear fuel assembly into the reactor core to avoid any chemical reaction, which could be detrimental to materials used in the primary circuit of the nuclear reactor. Such removal may be very difficult and it shall be demonstrated that there is no contamination, i.e. no residual lubricant on the fuel assembly and particularly into the contact areas between the fuel rods and the spacer grids. Non-water lubricant may also end-up with corrosion problem on the fuel rod cladding.

U.S. Pat. No. 3,757,403 teaches to apply a hoarfrost-like deposit (i.e. a "semi-porous dry frost resembling hoarfrost") to the nuclear fuel rod before it is inserted in a spacer grid assembly. To this end, the fuel rod is cooled to about 0° C. in a humid atmosphere, or, alternatively, the fuel rod is cooled to a temperature below 0° C. and allowed to warm to a temperature between about −10° C. and 0° C. in a humid atmosphere. The fuel rod is cooled using dry ice, e.g. by placing the fuel rod on a rack above dry ice.

SUMMARY

However, cooling the fuel rod to low temperatures and/or using ice for cooling the fuel rod have the risk of uncontrolled ice build-up which could damage a supporting feature of a spacer grid, such as a spring, upon insertion of the fuel rod through the spacer grid.

One of the aims of the disclosure is to provide a method of inserting a nuclear fuel rod into a nuclear fuel assembly armature which limits the risk of damaging the fuel rod or a spacer grid, with being easy to implement and limiting the risk of contamination of the fuel assembly.

To this end, the present disclosure provides a method of inserting a fuel rod through spacer grids of a nuclear fuel assembly, the method comprising inserting the fuel rod through the spacer grids aligned along an assembling axis with passing the fuel rod through a lubrication chamber aligned with the spacer grids such that the lubrication chamber is passed through by the fuel rod before the insertion of the fuel rod through one of the spacer grids, and circulating a lubrication fluid containing a gas and a lubricant in gaseous phase and/or mist form in the lubrication chamber, the lubrication fluid being injected in the lubrication chamber at a temperature strictly higher than ambient temperature, such that lubricant deposits or condensates in liquid phase with forming a lubricant film on an external surface of the fuel rod that is being inserted through said one of the spacer grids.

The insertion of the fuel rod through a spacer grid with lubricant in liquid phase deposited or condensed on the fuel rod allows obtaining an efficient lubrication of the fuel rod with limiting risks of damaging the fuel rod and/or the spacer grid. The lubrication can be implemented easily and efficiently with a low amount of lubricant. The lubricant is for example water, thus limiting chemical risk and avoiding the need of removing the lubricant after insertion of the fuel rod.

In specific embodiments, the method of inserting a fuel rod may comprise one or several of the following optional features, taken individually or in any technically feasible combination:

- the lubricant in the lubrication fluid injected in the lubrication chamber has a dew point strictly higher than ambient temperature;
- the lubrication fluid is injected in the lubrication chamber at a temperature strictly higher than the dew point of the lubricant in the lubrication fluid;
- the method comprises generating the lubrication fluid by spraying the lubricant in the gas;
- the method comprises heating the lubrication fluid before injecting the lubrication fluid in the lubrication chamber;
- the method comprises returning lubrication fluid collected at an outlet of the lubrication chamber to a lubrication fluid generator;
- the method comprises passing lubrication fluid collected at an outlet of the lubrication chamber through a condenser such as to retrieve lubricant in liquid phase at a liquid outlet of the condenser;
- the method comprises collecting lubrication fluid depleted in lubricant from a fluid outlet of the condenser and returning separately the lubrication fluid depleted in lubricant and the lubricant in liquid phase to a lubrication fluid generator;

the method comprises injecting dry gas in the lubrication chamber, with forming at least one dry gas stream circulating along a lubrication fluid stream in the lubrication chamber, and collecting the dry gas stream at an outlet of the lubrication chamber together with the lubrication fluid;

the method comprises forming two dry gas streams on either sides of the lubrication fluid stream in the lubrication chamber;

the gas of the lubricant fluid is air or inert gas and the lubricant is water, alcohol, acetone or admixture of them.

The present disclosure also relates to an assembling system for insertion of nuclear fuel rods through spacer grids of a nuclear fuel assembly, the assembling system comprising an assembling station comprising holding devices for holding respective spacer grids in an aligned configuration, and a lubrication system configured for lubricating at least one fuel rod that is being inserted through the spacer grids, the lubrication system comprising a lubrication chamber aligned with the spacer grids such that the lubrication chamber is passed through by each fuel rod before the insertion of each fuel rod through one of the spacer grids, the lubrication system comprising a lubrication circuit configured for injecting in the lubrication chamber a lubrication fluid containing a gas and a lubricant in gaseous phase and/or a mist form, the lubrication fluid in the lubrication chamber being at a temperature strictly higher than ambient temperature, such that lubricant deposits or condensates in liquid phase on each fuel rod during its travel through the lubrication chamber with forming a lubricant film on an external surface of the fuel rod.

In specific embodiments, the assembling system may comprise one or several of the following optional features, taken individually or in any technically feasible combination:

it comprises a lubrication fluid generator configured for generating lubricant fluid by spraying lubricant into the gas and/or a feedline heater configured for heating the lubrication fluid before injection of the lubrication fluid into the lubrication chamber;

it comprises a condenser having an inlet fluidly connected to an outlet of the lubrication chamber for receiving lubrication fluid collected at the outlet of the lubrication chamber, the condenser having a fluid outlet and a liquid outlet which are separately fluidly connected to a lubrication fluid generator configured for generating lubricant fluid by spraying lubricant into the gas;

it comprises a gas injection circuit configured for generating at least one dry gas stream flowing along a lubrication fluid stream in the lubrication chamber, preferably two dry gas streams on either sides of the lubrication fluid stream.

BRIEF DESCRIPTION OF THE DRAWINGS

The present disclosure and its advantages will be better understood upon reading the following description given solely by way of non-limiting example and with reference to the appended drawings, in which.

DETAILED DESCRIPTION

Figure 1:
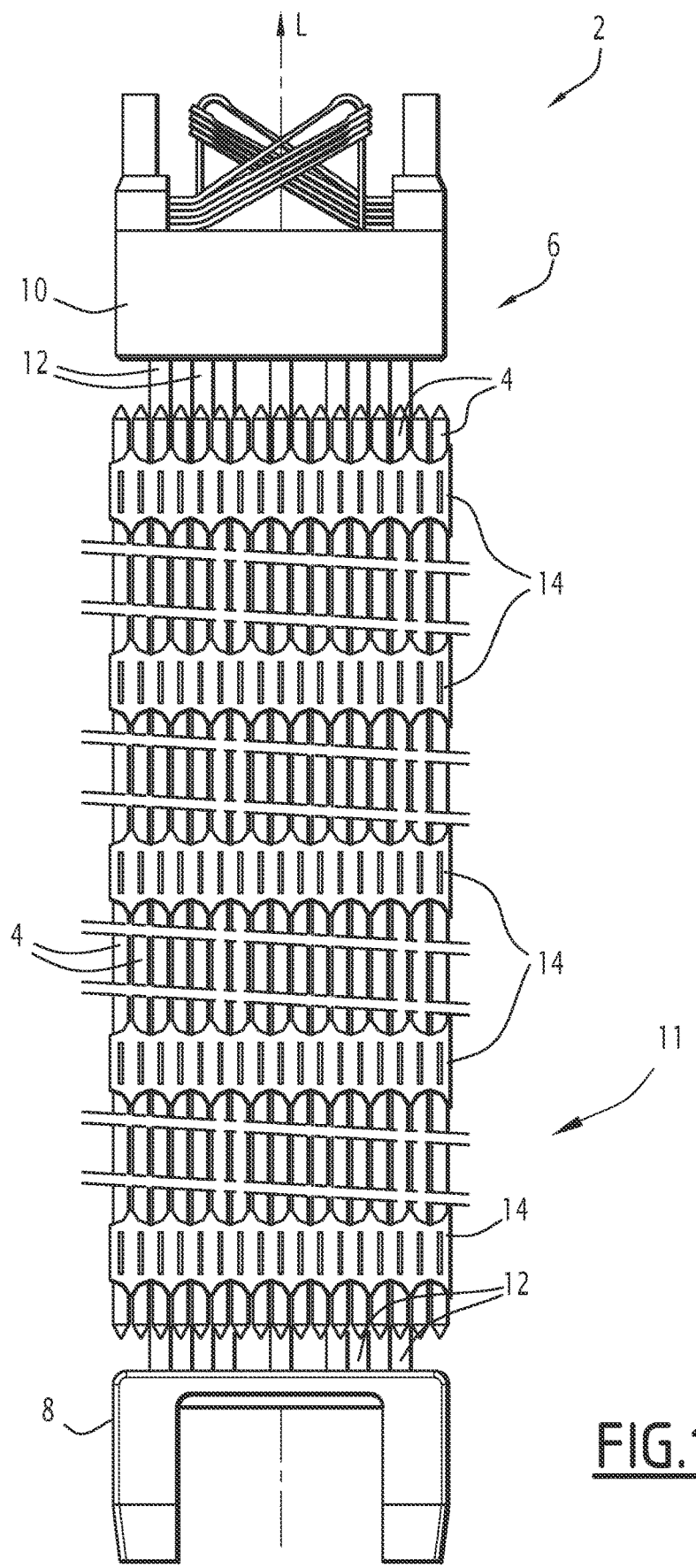
FIG. 1 is a diagrammatic view of a nuclear fuel assembly.

The nuclear fuel assembly 2 of FIG. 1 comprises a bundle of nuclear fuel rods 4 and a skeleton 6 for supporting the fuel rods 4.

The fuel rods 4 extend parallel to each other and to a fuel assembly axis L. The fuel assembly 2 is elongated along the assembly axis L. The assembly axis L extends vertically when the fuel assembly 2 is disposed inside a nuclear reactor.

The skeleton 6 comprises a lower nozzle 8, an upper nozzle 10 and an armature 11 comprising a plurality of guide-tubes 12 and a plurality of spacer grids 14. The armature 11 may in addition comprise an instrumentation tube, not represented in the Figures.

The guide-tubes 12 extend parallel to the assembly axis L and connect the lower nozzle 8 to the upper nozzle 10 with maintaining a predetermined spacing along assembly axis L between the lower nozzle 8 and the upper nozzle 10. The fuel rods 4 are received into the armature 11 so as to be located between the lower nozzle 8 and the upper nozzle 10 in the fuel assembly 2.

Each guide-tube 12 opens upwards through the upper nozzle 10 for allowing insertion of a control rod into the guide-tube 12.

The spacer grids 14 are distributed along the guide-tubes 12 between the lower nozzle 8 and the upper nozzle 10 of the fuel assembly 2. The spacer grids 14 are spaced from each other. Each spacer grid 14 is fixedly attached to the guide-tubes 12 which extend through the spacer grid 14.

Each spacer grid 14 is configured for supporting the fuel rods 4 in a spaced relationship. Each spacer grid 14 is configured for supporting the fuel rods 4 along the assembly axis L and transversely to the assembly axis L.

Each spacer grid 14 comprises individual fuel rod cells 16 (FIG. 2), each fuel rod cell 16 being configured to receive a respective fuel rod 4.

Each fuel rod cell 16 is provided with supporting features configured for contacting and supporting the corresponding fuel rod 4. The supporting features comprise for example one or several elastic spring(s) and/or one or several rigid dimple(s).

Figure 2:
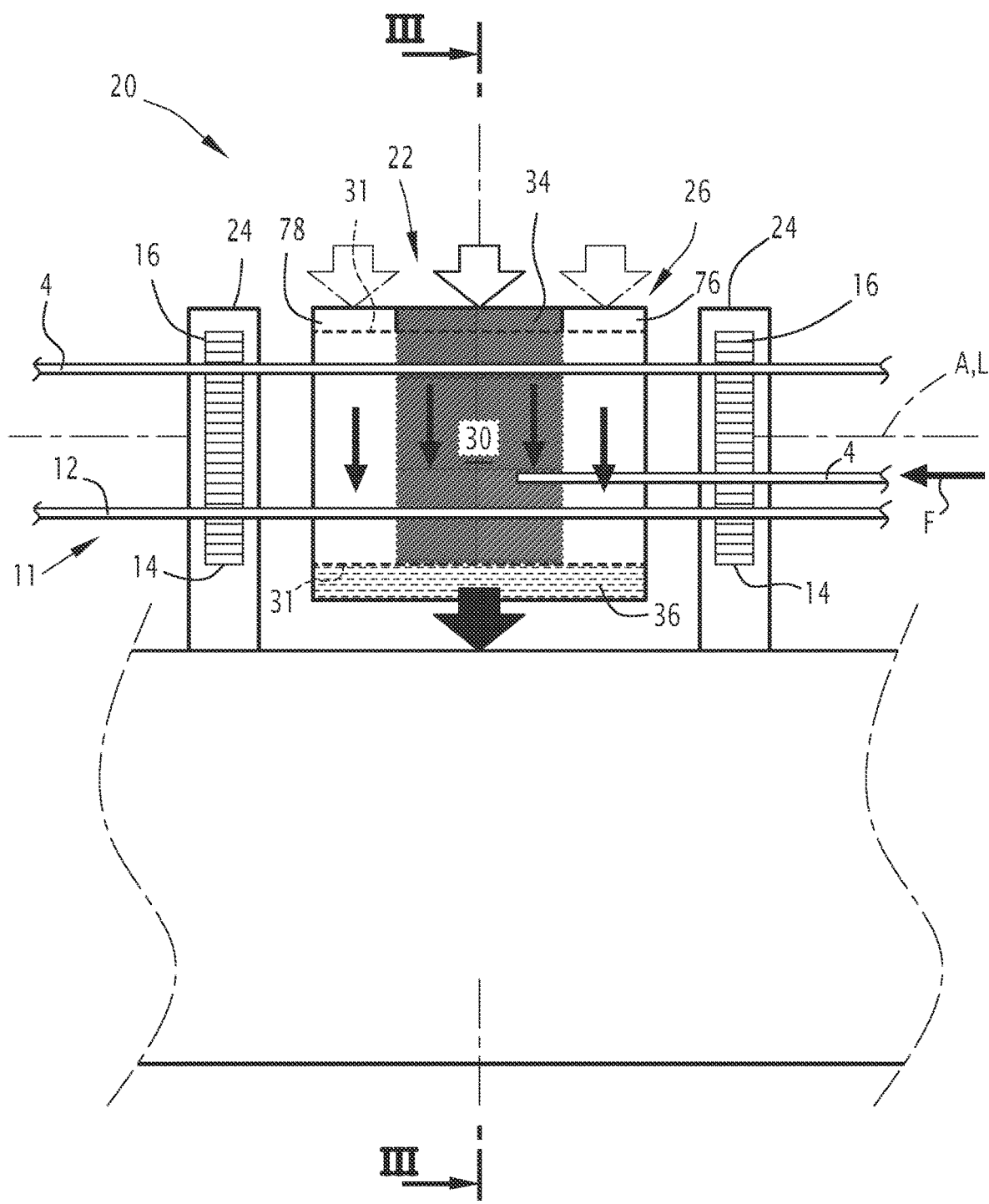
FIG. 2 is a diagrammatic longitudinal cross-sectional view of an assembling system for assembling a nuclear fuel assembly, illustrating a lubrication chamber of a lubrication system of the assembling system.
Figure 3:
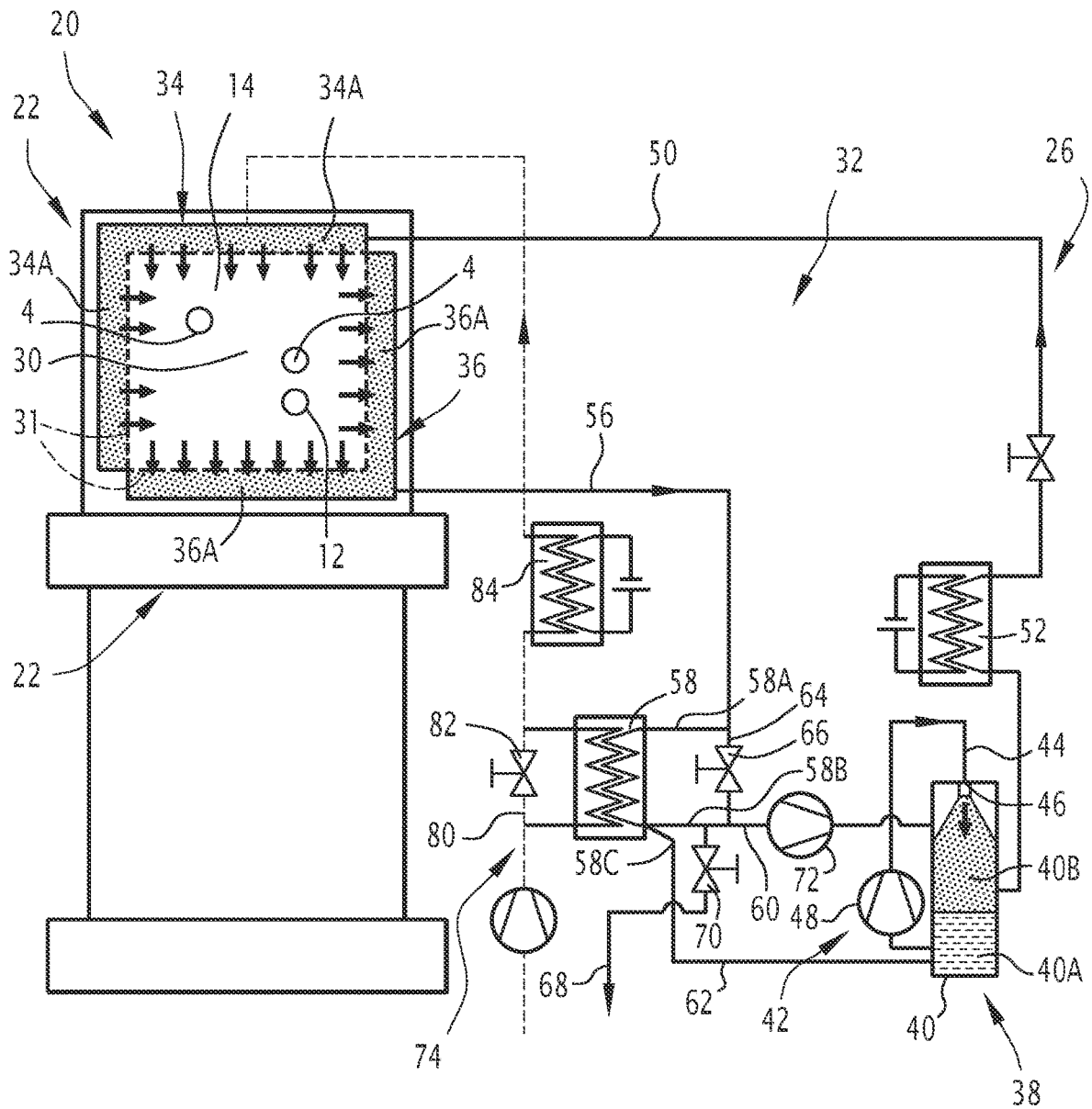
FIG. 3 is a diagrammatic transverse cross-sectional view of the assembling system taken along in FIG. 2 and illustrating a lubrication circuit of the lubrication system.

FIGS. 2 and 3 illustrate an assembling system 20 configured for assembling a fuel assembly 2 by inserting the fuel rods 4 through the spacer grids 14 of the armature 11, aligned along an assembling axis A.

The assembling system 20 comprises an assembling station 22 comprising several aligned spacer grid holding devices 24, each holding device 24 being configured for holding or supporting a respective spacer grid 14 of the armature 11. The spacer grids 14 held by the holding devices 24 are aligned along the assembling axis A which corresponds to the assembly axis L of the fuel assembly 2.

Each spacer grid 14 held by a holding device 24 extends in a plane perpendicular to the assembling axis A. The fuel rod cells 16 of the spacer grid 14 extend in the assembling axis A.

Each holding device 24 is for example a holding clamp configured for clamping the corresponding spacer grid 14 in a predetermined assembling position.

When the armature 11 is received in the assembling station 22 with its spacer grids 14 aligned in the assembling axis A, each fuel rod 4 can be inserted through the spacer grids 14 along the assembling axis A, in a direction of insertion F illustrated in FIG. 2.

The assembling system 20 comprises a lubrication system 26 configured for lubricating the fuel rods 4 upon insertion of the fuel rods 4 through the spacer grids 14.

The lubrication system 26 comprises at least one lubrication chamber 30 configured to be placed upstream of a spacer grid 14 when considering the direction of insertion F of the fuel rods 4 through the spacer grids 14, for lubrication of the fuel rods 4 that are to be inserted through said spacer grid 14.

As illustrated on FIG. 2, the lubrication chamber 30 is preferably located between two successive spacer grids 14.

Other locations are possible. For example, in an alternative, the lubrication chamber 30 is located upstream of the first holding device 24 of the assembling station 22.

Besides, the lubrication system 26 may comprise one lubrication chamber 30 or several lubrication chambers 30 distributed along the assembling axis A to increase efficiency.

In the example, the lubrication chamber 30 has an inner cross-section which corresponds at least to that of the bundle of fuel rods 4 (FIG. 3), such that the lubrication chamber 30 can be kept in the same position for insertion of all the fuel rods 4 of the bundle.

The lubrication chamber 30 has side walls 31 defining the cross-section of the lubrication chamber 30.

The side walls 31 of the lubrication chamber 30 are illustrated on FIGS. 2 and 3 by dotted line to illustrate that in this example a lubrication fluid may flow through these side walls 31 to enter the lubrication chamber 30 and exit the lubrication chamber 30.

As illustrated on FIG. 3, the lubrication system 26 comprises a lubrication circuit 32 for circulating a lubrication fluid stream through the lubrication chamber 30.

The lubrication fluid is for example a gas containing the lubricant in gaseous phase and/or in the form of liquid fine droplets in suspension in the lubrication fluid. The liquid fine droplets in suspension in the lubrication fluid are referred to as a "mist".

The lubrication circuit 32 comprises a fluid distributor 34 for injecting the lubrication fluid into the lubrication chamber 30 and a fluid collector 36 for collecting the lubrication fluid that has circulated through the lubrication chamber 30.

In the example illustrated on FIGS. 2 and 3, the distributor 34 is configured to inject the lubrication fluid into the lubrication chamber 30 through first side walls 31 and the collector 36 is configured to collect the lubrication fluid through second side walls 31 opposed to the first side walls 31.

In operation, the lubrication fluid flows through the lubrication chamber 30 from the distributor 34 to collector 36.

The distributor 34 and the collector 36 are configured such that, in operation, the lubrication fluid stream flows in the lubrication chamber 30 essentially perpendicularly to the assembling axis A.

In the illustrated example of FIG. 3, the lubrication chamber 30 has a quadrangular cross-section in view along the assembling axis A, and the distributor 34 and the collector 36 extend along sides of the quadrangular cross-section.

The lubrication chamber 30 has four side walls 31 defining the quadrangular cross-section of the lubrication chamber 30.

The distributor 34 is here configured to inject lubrication fluid through two adjacent side walls 31, the collector 36 being arranged to collect the lubrication fluid through the two other adjacent side walls 31.

The distributor 34 is for example L-shaped with two injection ramps 34A each extending along a respective side wall 31, and the collector 36 is also L-shaped with two collection ramps 36A each extending along a respective side wall 31.

Other arrangements of the distributor 34 and the collector 36 are possible. For example, the distributor 34 may be configured for injecting lubrication fluid through one, two or three side walls 31 of the lubrication chamber 30. Besides, the collector 36 may be configured for collecting fluid through one, two or three side walls 31 of the lubrication chamber 30.

The lubrication chamber 30 may have a cross-section that differs from a quadrangular cross-section, e.g. a polygonal cross-section having less than four sides or more than four sides, in particular a hexagonal cross-section.

In one specific embodiment which is not illustrated, the distributor 34 is configured to inject lubrication fluid along one single side of the polygonal cross-section, the collector 36 being configured to collect the lubrication fluid along one single side of the polygonal cross-section, opposite to the side along which the lubrication fluid is injected by the distributor 34.

In another specific embodiment, the distributor 34 and the collector 36 are located along one or several same side(s) of the polygonal section, in particular a lower side. In this embodiment, lubricant fluid is injected by the distributor 34 from this(these) side(s) and fallouts are collected from the same side(s) by the collector 36. The distributor 34 and the collector 36 are for example in a same distributing/collecting unit.

The lubrication circuit 32 comprises a lubrication fluid generator 38 configured for generating the lubrication fluid containing gas and lubricant in gaseous phase and/or mist form.

The lubrication fluid generator 38 comprises a tank 40 containing the lubricant in liquid phase in a bottom part 40A of the tank 40 and lubrication fluid in an upper part 40B (gaseous phase and/or mist form).

The lubrication fluid generator 38 comprises a spraying device 42 configured for spraying lubricant in the upper part 40B of the tank 40. The spraying device 42 comprises a duct 44 extending from the bottom part 40A of the tank 40 to at least one spraying nozzle 46 arranged for injecting the lubricant in the upper part 40B of the tank 40.

The spraying device 42 comprises for example a spraying pump 48 for forcing the lubricant in liquid phase to flow in the duct 44 from the bottom part 40A of the tank 40 to the at least one spraying nozzle 46.

Optionally, the spraying device 42 comprises a heater (not showed) configured to heat the liquid lubricant and/or the tank 40 integrates a heater in order to better adjust the temperature of the lubricant.

Spraying the liquid lubricant in the upper part 40B of the tank 40, preferably with controlled temperature of the lubricant, allows maintaining lubrication fluid in gaseous phase and/or mist form with a controlled dew point in the upper part 40B of the tank 40.

The lubrication fluid generator 38 is fluidly connected to the lubrication chamber 30 for injection of lubrication fluid into the lubrication chamber 30.

The lubrication circuit 32 comprises for example a feedline 50 fluidly connecting the lubrication fluid generator 38, more specifically the upper part 40B of the tank 40 of the lubrication fluid generator 38, to the distributor 34 for feeding the distributor 34 with lubrication fluid produced by the lubrication fluid generator 38.

The lubrication circuit 32 optionally comprises a feedline heater 52 arranged on the feedline 50 for heating the lubrication fluid feeding the distributor 34. The feedline heater 52 is located along the feedline 50 between the lubrication fluid generator 38 and the distributor 34.

The feedline heater 52 is for example an electrical heater, i.e. heater configured for converting electrical energy into heat energy used to overheat the lubrication fluid.

The lubrication circuit 32 is for example configured for returning the lubrication fluid to the lubrication fluid generator 38, in particular to the tank 40 of the lubrication fluid generator 38, and/or for releasing the lubrication fluid, preferably after extraction of at least part of the lubricant from the lubrication fluid.

The lubrication circuit 32 comprises a return line 56 for returning the lubrication fluid to the lubrication fluid generator 38, here to the tank 40 of the lubrication fluid generator 38. The return line 56 extends from the collector 36 to the lubrication fluid generator 38, here to the tank 40 of the lubrication fluid generator 38.

The lubrication circuit 32 comprises a condenser 58 for condensing the lubricant contained in the lubrication fluid collected by the collector 36.

The condenser 58 is for example configured for a heat exchange between the lubrication fluid and another fluid, e.g. ambient air, for condensing the lubricant.

The condenser 58 comprises an inlet 58A for receiving the lubrication fluid collected by the collector 36. The inlet 58A is fluidly connected to the collector 36 via the return line 56.

The condenser 58 comprises a fluid outlet 58B for the lubrication fluid depleted in lubricant and a liquid outlet 58C for the lubricant in liquid phase condensed in the condenser 58. The fluid outlet 58B and the liquid outlet 58C are fluidly connected to the lubrication fluid generator 38, here to the tank 40, separately, via respective lines.

The fluid outlet 58B is fluidly connected to the upper part 40B of the tank 40, e.g. via a fluid return line 60, and the liquid outlet 58C is fluidly connected to the bottom part 40A of the tank 40 via a liquid return line 62.

Optionally, the lubrication circuit 32 comprises a by-pass line 64 for by-passing the condenser 58. For example, the by-pass line 64 connects the return line 56 to the fluid return line 60.

The lubrication circuit 32 preferably comprises a flow control device configured for controlling the flow of the lubrication fluid selectively through the condenser 58 or through the by-pass line 64. The flow control device is for example a valve 66 arranged on the by-pass line 64 for selectively opening of closing the by-pass line 64.

The lubrication circuit 32 optionally comprises a gas vent 68 for expelling gas from the lubrication circuit 32. The gas vent 68 is here provided on the fluid return line 60.

The lubrication circuit 32 comprises a gas vent control device 70 for selectively closing and opening the gas vent 68. The gas vent control device 70 is for example a valve provided at the gas vent 68.

The lubrication circuit 32 comprises a circulation pump 72 for circulating the lubrication fluid in the lubrication circuit 32. The circulation pump 72 is for example arranged on the fluid return line 60.

Optionally, the lubrication circuit 32 comprises a gas injection circuit 74 configured for injecting dry gas into the lubrication circuit 32.

"Dry gas" here designates the gas used in the lubrication fluid as a transporting gas for the lubricant, but containing no lubricant or less lubricant as compared to the lubrication fluid injected into the lubrication chamber 30.

The gas injection circuit 74 is configured for injecting dry gas in the lubrication chamber 30. This enables the lubrication chamber 30 and the already inserted fuel rods 4 to be dried during in a dry mode phase before the next fuel rod insertion step.

The dry gas injected into the lubrication chamber 30 is for instance collected by the collector 36 together with the lubrication fluid.

As illustrated on FIG. 2, the gas injection circuit 74 comprises at least one injector 76, 78 for generating a dry gas stream in the lubrication chamber 30.

The gas injection circuit 74 is advantageously configured for generating stratified streams of dry gas and lubrication fluid inside the lubrication chamber 30 in the direction of insertion F.

A fuel rod 4 being inserted through a spacer grid 14 and passing through an upstream lubrication chamber 30 will sequentially pass through the lubrication fluid stream and the dry gas stream(s).

Each dry gas stream acts as an airlock and allows channeling the lubrication fluid stream containing the lubricant to ensure that the lubrication fluid remains in the lubrication circuit 32, thus avoiding lubricant losses or leaks.

Each dry gas stream is configured to form a gas curtain that tends to maintain the lubrication fluid stream perpendicular to the assembling axis A and prevents the lubrication fluid stream to deviate axially along the assembling axis A.

The gas injection circuit 74 is for example configured for generating an upstream dry gas stream in the lubrication chamber 30 before the lubrication fluid stream and/or a downstream dry gas stream after the lubrication fluid stream when considering the direction of insertion F of the fuel rods 4 through the spacer grid 14.

Hence, the fuel rod 4 will pass through an upstream dry gas stream before passing through the lubrication fluid stream and/or through a downstream dry gas stream after passing through the lubrication fluid stream.

In the illustrated example, the gas injection circuit 74 is configured for generating an upstream dry gas stream in the lubrication chamber 30 before the lubrication fluid stream and a downstream dry gas stream after the lubrication fluid stream when considering the direction of insertion F of the fuel rods 4 through the spacer grid 14.

The gas injection circuit 74 here comprises an upstream injector 76 for generating an upstream dry gas stream in the lubrication chamber 30 upstream of the lubrication fluid stream and a downstream injector 78 for generating a dry gas stream in the lubrication chamber 30 downstream of the lubrication fluid steam.

The dry gas flows on either sides of the lubrication fluid stream and forces the lubrication fluid to exit the lubrication chamber 30 via the fluid collector 36.

As illustrated in FIG. 3, optionally, the gas injection circuit 74 is configured to force the dry gas feeding the lubrication chamber 30 to pass via the condenser 58 for a heat exchange with the lubrication fluid passing via the condenser 58 in the lubrication circuit 32.

Preferably, the gas injection circuit 74 comprises a by-pass line 80 for by-passing the condenser 58.

In such a case, the gas injection circuit 74 preferably comprises a gas flow control device 82 for causing dry gas to flow selectively via the condenser 58 or via the by-pass line 80. The gas flow control device 82 is e.g. a valve arranged on the by-pass line 80 for selectively opening or closing the by-pass line 80.

Optionally, the gas injection circuit 74 comprises a gas heater 84 for heating the dry gas before feeding the lubrication chamber 30. The gas heater 84 is for example an electrical heater, i.e. a heater configured for using electric energy to generate heat transferred to the dry gas.

This enables the lubrication chamber 30 and the already inserted fuel rods 4 to be heat up during the dry mode phase before the next fuel rod insertion step.

As illustrated on FIG. 2, advantageously, the lubrication chamber 30 is placed in the assembling station 22 between two consecutive holding devices 24, i.e. between a holding device 24 and the next one in the alignment of spacer grids 14 when considering the direction of insertion F of the fuel rod 4, such as to provide lubrication between two consecutive spacer grids 14.

This allows lubricating a fuel rod 4 after this fuel rod 4 has been inserted in one or several spacer grids 14. Indeed, the lubricant deposited on the fuel rod 4 may be at least partially removed after inserting the fuel rod 4 through one or several spacer grid(s) 14. The lubrication chamber 30 located between two holding devices 24 allows lubricating the fuel rod 4 again for the one or several following spacer grid(s) 14.

As already indicated, optionally or alternatively, a lubrication chamber 30 is placed in front of the first spacer grid 14, such as to provide lubrication before the insertion of the fuel rod 4 through the first spacer grid 14.

One single lubrication chamber 30 is illustrated on FIGS. 2 and 3. In a general manner, the lubrication system 26 may comprise one or several lubrication chamber(s) 30 located at different locations along the assembling system 20. The lubrication system 26 may comprise a lubrication chamber 30 in front of the first holding device 24 and one or several lubrication chamber(s) 30 distributed along the assembling system 20, between consecutive holding devices 24.

Preferably, the lubrication system 26 is configured to operate in two different operating modes, i.e. a first mode or "dry" mode and a second mode or "wet" mode.

In the dry mode, the lubrication chamber 30 is fed only with hot dry gas. The dry mode is used to heat up the section of the fuel rods 4 already inserted in the armature 11 of the fuel assembly 2 and extending through the lubrication chamber 30, in order to keep them hot and free of condensate during a wet mode.

In the wet mode, the lubrication chamber 30 is fed with gas containing lubricant in gaseous phase and/or mist form. This wet mode is needed for lubricating a fuel rod 4 during its travel through the lubrication chamber 30 just before its insertion through a spacer grid 14 or a series of spacer grids 14.

In the wet mode, as the fuel rods 4 already inserted in the armature 11 have been heated during the dry mode phase, the lubricant of the lubricant fluid condensates and/or deposits only on the cold fuel rod 4 being currently inserted.

Switching between the dry mode and the wet mode may be performed e.g. by controlling the lubrication fluid generator 38.

A method of inserting at least one fuel rod 4 through spacer grids 14 of a nuclear fuel assembly 2 which can be implemented with using the assembling system 20 will now be described.

The method is described with reference to FIGS. 2 and 3 with referring to the insertion of one fuel rod 4 with the provision of one lubrication chamber 30.

However, it is to be understood that in practice one fuel rod 4 may be inserted individually or several fuel rod(s) 4 may be inserted simultaneously with the provision of one or several lubrication chamber(s) 30 along the path of each fuel rod 4 that is being inserted.

The method comprises inserting a fuel rod 4 at ambient temperature through spacer grids 14 with passing the fuel rod 4 through the lubrication chamber 30 aligned with the spacer grids 14, the lubrication chamber 30 being located upstream of one of the spacer grids 14, and circulating a lubrication fluid containing a gas and a lubricant in gaseous phase and/or mist form in the lubrication chamber 30, the lubrication fluid being injected in the lubrication chamber 30 at a temperature strictly higher than ambient temperature, such that lubricant deposits or condensates in liquid phase on the fuel rod 4 with forming a lubricant film on the external surface of the fuel rod 4.

"Ambient temperature" refers here to the actual temperature of the air in the area where the assembling system 20 is located.

Preferably, the lubrication fluid is generated with a lubricant dew point which is strictly higher than the ambient temperature.

Preferably, the lubrication fluid has a dew point which is at least 5° C. higher than ambient temperature, more preferably at least 10° C. higher than ambient temperature, more preferably 20° C. higher than ambient temperature.

Preferably, the lubrication fluid is injected in the lubrication chamber 30 at a temperature which is strictly higher than the dew point of the lubricant in the lubrication fluid.

Preferably, the lubrication fluid is injected in the lubrication chamber 30 at a temperature which is at least 5° C. higher than the dew point of the lubricant, more preferably at least 10° C. higher than the dew point of the lubricant.

Optionally, the method comprises heating the lubrication fluid. Heating is here performed in the feedline heater 52.

The dew point of the lubricant in the lubrication fluid generator 38 is a function of the percentage of lubricant in gaseous phase contained in the lubrication fluid and the temperature of the lubrication fluid.

Preferably, the lubrication fluid is overheated by a few degrees to avoid condensing on the walls of the feedline 50 and the side walls 31 of the lubrication chamber 30 of the lubrication system 26. In the lubrication system 26, the feedline heater 52 is controlled to keep the temperature of the lubrication fluid over its dew point. The heating temperature is a function of the content of lubricant in gaseous phase in the fluid generated by the lubrication fluid generator 38.

The fuel rod 4 that is being inserted in the lubrication chamber 30 is at ambient temperature, which is strictly inferior to the dew point of lubricant in the lubrication fluid.

Upon contacting the external surface of the fuel rod 4, lubricant in gaseous phase and/or mist form contained in the lubrication fluid condensates on the fuel rod external surface thus forming a thin lubricant film.

Injecting the lubrication fluid in the lubrication chamber 30 with such lubricant dew point allows to feed the lubrication chamber 30 with a lubrication fluid containing lubricant in gaseous phase and/or mist form, which can condensate on the fuel rod 4 during its travel through the lubrication chamber 30, thus with forming a thin lubricant film.

The fuel rod 4 can thus be inserted in one or several following spacer grid(s) 14 with limiting the risk of damaging the fuel rod 4 and/or the risk of uncontrolled burring of the spacer grid(s) 14.

The method may comprise generating lubrication fluid by spraying lubricant in the gas. This is performed in the lubrication circuit 32 by the lubrication fluid generator 38.

Optionally, the method comprises circulating the lubrication fluid in a lubrication circuit 32 in closed loop. This allows limiting the consumption of lubricant. In the illustrated example, the lubrication circuit 32 is in closed loop. In particular, the lubrication fluid exiting the lubrication chamber 30 is returned to the lubrication fluid generator 38, here via the return line 56.

Optionally, in an operating mode, for example prior to the dry mode phase, the method comprises passing the lubrication fluid collected from the lubrication chamber 30 in a condenser 58 to obtain separately lubrication fluid depleted in lubricant and lubricant in liquid phase, and returning lubrication fluid depleted in lubricant and lubricant in liquid phase separately to a lubrication fluid generator 38.

This allows controlling the amount of lubricant present in the lubrication fluid in liquid phase and/or in mist form, using the lubrication fluid generator 38. The amount of lubricant in the lubrication fluid is lowered by the condenser 58, the lubrication fluid generator 38 allowing increasing this amount to the desired value, e.g. for obtaining the appropriate dew point in conjunction with the temperature of the lubrication fluid injected in the lubrication chamber 30.

Optionally, in an operating mode, for example during the wet mode phase, when the conditions do not require lowering the amount of lubricant in the lubrication fluid before returning the lubrication fluid to the lubrication fluid generator 38, the method comprises by-passing the condenser 58 via the by-pass line 64. In such a case, the lubrication fluid is returned directly from the lubrication chamber 30 to the lubrication fluid generator 38 with by-passing the condenser 58.

Optionally, the method comprises injecting dry gas in the lubrication chamber 30, via the gas injection circuit 74. The dry gas injected in the lubrication chamber 30 is collected at the outlet of the lubrication chamber 30 together with the lubrication fluid. The dry gas in excess may be released via the gas vent 68 while using the condenser 58.

The dry gas is mixed to the lubrication fluid and increases the proportion of gas with respect to the proportion of lubricant in the lubrication fluid. The lubrication fluid and the dry gas are collected by the collector 36.

Preferably, at least one dry gas stream is generated in the lubrication chamber 30, the dry gas stream channeling the lubrication fluid stream. More, preferably two dry gas streams are generated on either sides of the lubrication fluid stream, the two dry gas streams channeling the lubrication fluid stream between them.

Optionally, the dry gas is heated before injection in the lubrication chamber 30. The dry gas is here heated in the condenser 58, the dry gas being used as a cold source for the condenser 58, and/or in the gas heater 84.

Optionally, the method comprises releasing lubrication fluid exiting the condenser 58, i.e. "dried" lubrication fluid in which the amount of lubricant has been lowered. The lubrication fluid depleted in lubricant may here be released via the gas vent 68.

The release of lubrication fluid from the lubrication circuit 32 allows keeping the proportion of gas and lubricant in the lubrication circuit 32 and/or accounting for the dry gas injected in the lubrication circuit 32 via the gas injection circuit 74.

Once a fuel rod 4 is inserted through all the spacer grids 14 of the armature 11, a section of the fuel rod 4 extends through the lubrication chamber 30 of the lubrication system 26. However, this section of the fuel rod 4 which is in the lubrication chamber 30 is heated substantially to the temperature of the lubrication fluid entering the lubrication chamber 30. Therefore, lubricant contained in the lubrication fluid does not deposit or condensate on the external surface of this section of the fuel rod 4, notably during subsequent insertion of one or several other fuel rod(s) 4.

When no fuel rod 4 is being inserted, the lubrication system 26 is operated under dry mode conditions, i.e. with heated dry gas atmosphere or lubrication fluid depleted in lubricant, to keep the lubrication chamber 30 and the fuel rods 4 already inserted into the fuel assembly 2 at a temperature higher than the dew point of the lubrication fluid. Thus, the lubricant in the lubrication fluid remains available for a fuel rod 4 at ambient temperature that is being inserted in the lubrication chamber 30.

In a preferred embodiment, the gas is air and the lubricant is water. Hence, the lubrication fluid is moist air and the dry gas is dry air. The lubrication fluid generator 38 is for example an air moisturizer.

In one embodiment, the moist air injected in the lubrication chamber 30 has a humidity content such that the dew point is equal to or higher than 40° C., preferably equal to or higher than 60° C.

When the dew point is equal to or higher than 40° C., the lubrication fluid heater is configured for heating the moist air to 45° C., preferably 50° C. When the dew point is equal or higher than 60° C., the lubrication fluid heater is configured for heating the moist air to 65° C., preferably 70° C.

In variants, the transporting gas may not be air, but, e.g. an inert gas such as dinitrogen ($N_2$) and/or the lubricant may not be water but a volatile lubricant such as alcohol or acetone or admixture.

Owing to the present disclosure, during insertion of a fuel rod 4 through spacer grids 14, it is possible to lubricate the fuel rod 4 efficiently with a small amount of lubricant and with limiting the risk of damaging or chemically contaminating the fuel rod 4 and/or the spacer grid 14.

In particular, the use of water as lubricant and air or dinitrogen as transporting gas for the lubricant avoids any contamination. Alternatively, the use of volatile lubricants such as alcohol or acetone limits the risk of contamination.

Passing the fuel rod 4 through at least one lubrication chamber 30 during insertion of the fuel rod 4 in the armature 11 is particularly efficient for lubrication the fuel rod 4 just in time for the insertion. It allows limiting the amount of lubricant.

The lubricant deposits or condensates only or at least preferably on the section of a fresh fuel rod 4 at ambient temperature which is being inserted in a spacer grid 14, whereas the section of each stationary fuel rod 4 already inserted in said spacer grid 14 and located in the lubrication chamber 30 is at a higher temperature which does not promote deposition or condensation of the lubricant on this section.

The lubrication system 26 allows circulating the lubricant through the lubrication chamber 30 in a closed loop thus retrieving lubricant which has not deposited or condensed on a fuel rod 4.

The present disclosure is not limited to the examples described above, modifications being possible without departing from the present disclosure.

Besides, according to an aspect which is advantageous independently of the specific lubrication, a fuel rod, more specifically a section of the fuel rod, is lubricated during insertion of the fuel rod through spacer grids of the armature and between two spacer grids of the armature.

Hence, in a general manner, the present disclosure relates to a method of assembling a nuclear fuel assembly comprising inserting a bundle of fuel rods through a plurality of spacer grids aligned along an assembling axis, and lubricating the fuel rods, more specifically a section of the fuel rods, between two consecutive spacer grids during insertion of the fuel rods.

The present disclosure also relates in a general manner to an assembling system comprising holding devices for holding spacer grids of an armature of a nuclear fuel assembly, the holding devices and the spacer grids being aligned along an assembling axis, and a lubrication system comprising a lubrication chamber configured to be interposed between two consecutive spacer grids held by the holding devices such that a fuel rod inserted through the spacer grids of the armature passes through the lubrication chamber, the lubrication system being configured for the injection of a lubrication fluid containing lubricant in the lubrication chamber, such that lubricant deposits or condensates on a section of the fuel rod while located in the lubrication chamber.

Besides, as illustrated on FIG. 3, the lubrication system 26 may comprise one or several isolated lubrication chamber(s) 30, each lubrication chamber 30 being placed upstream a respective holding device 24 holding a spacer grid 4 for lubricating the fuel rods 14 before their insertion through said spacer grid 4.

In an alternative embodiment, the lubrication system 26 may comprises a lubrication enclosure spanning over one or several holding devices 24 and comprising several lubrication chambers 30 defined inside the lubrication enclosure and spaced one from the other along the insertion direction, each lubrication chamber 30 being located in front a respective holding device 24 for lubricating the fuel rods 14 before their insertion through the spacer grid 4 held by said holding device 24.

What is claimed is:

1. An assembling system for insertion of nuclear fuel rods through spacer grids of a nuclear fuel assembly, the assembling system comprising:
    an assembling station comprising holding devices for holding respective spacer grids in an aligned configuration; and
    a lubrication system configured for lubricating at least one fuel rod that is being inserted through the spacer grids, the lubrication system comprising a lubrication chamber aligned with the spacer grids such that the lubrication chamber is passed through by each fuel rod before the insertion of each fuel rod through one of the spacer grids, the lubrication system comprising a lubrication circuit configured for injecting in the lubrication chamber a stream of a lubrication fluid containing a gas and a lubricant in gaseous phase and/or a mist form, the lubrication fluid in the lubrication chamber being at a temperature strictly higher than an ambient temperature, such that lubricant deposits or condensates in liquid phase on each fuel rod during its travel through the lubrication chamber with forming a lubricant film on an external surface of the fuel rod,
    the gas being air or an inert gas,
    the lubricant being water, alcohol, acetone or a mixture thereof.

2. The assembling system as in claim 1, further comprising at least one of:
    a lubrication fluid generator configured for generating the lubrication fluid by spraying lubricant into the gas, and
    a feedline heater configured for heating the lubrication fluid before injection of the lubrication fluid into the lubrication chamber.

3. The assembling system as in claim 1, further comprising a condenser having an inlet fluidly connected to an outlet of the lubrication chamber for receiving the lubrication fluid collected at the outlet of the lubrication chamber, the condenser having a fluid outlet and a liquid outlet which are separately fluidly connected to a lubrication fluid generator configured for generating the lubrication fluid by spraying lubricant into the gas.

4. The assembling system as in claim 1, further comprising a gas injection circuit configured for generating at least one dry gas stream flowing along the lubrication fluid stream in the lubrication chamber.

5. The assembling system as in claim 4, wherein the gas injection circuit is configured for generating two dry gas streams, one of the dry gas streams being on one side of the lubrication fluid stream and another of the dry gas streams being on an opposite side of the lubrication fluid stream.

6. A method of inserting a fuel rod through spacer grids of a nuclear fuel assembly using the assembling system as recited in claim 1, the method comprising:
    inserting the fuel rod through the spacer grids aligned along an assembling axis with passing the fuel rod through the lubrication chamber aligned with the spacer grids by the assembling station such that the lubrication chamber is passed through by the fuel rod before the insertion of the fuel rod through one of the spacer grids; and
    circulating the lubrication fluid containing the gas and the lubricant in gaseous phase and/or mist form in the lubrication chamber, the lubrication fluid being injected by the lubrication system in the lubrication chamber at the temperature strictly higher than the ambient temperature, such that lubricant deposits or condensates in liquid phase with forming the lubricant film on the external surface of the fuel rod that is being inserted through said one of the spacer grids.

7. The method of inserting a nuclear fuel rod as in claim 6, wherein the lubricant in the lubrication fluid injected in the lubrication chamber has a dew point strictly higher than the ambient temperature.

8. The method of inserting a nuclear fuel rod as in claim 6, wherein the lubrication fluid is injected in the lubrication chamber at a temperature strictly higher than a dew point of the lubricant in the lubrication fluid.

9. The method of inserting a nuclear fuel rod as in claim 6, further comprising generating the lubrication fluid by spraying the lubricant in the gas.

10. The method of inserting a nuclear fuel rod as in claim 6, further comprising heating the lubrication fluid before injecting the lubrication fluid in the lubrication chamber.

11. The method of inserting a nuclear fuel rod as in claim 6, comprising returning lubrication fluid collected at an outlet of the lubrication chamber to a lubrication fluid generator.

12. The method of inserting a nuclear fuel rod as in claim 6, further comprising passing lubrication fluid collected at an outlet of the lubrication chamber through a condenser such as to retrieve lubricant in liquid phase at a liquid outlet of the condenser.

13. The method of inserting a nuclear fuel rod as in claim 12, further comprising collecting lubrication fluid depleted in lubricant from a fluid outlet of the condenser and returning separately the lubrication fluid depleted in lubricant and the lubricant in liquid phase to a lubrication fluid generator.

14. The method of inserting a nuclear fuel rod as in claim 6, further comprising injecting dry gas in the lubrication chamber, with forming at least one dry gas stream circulating along a lubrication fluid stream in the lubrication chamber, and collecting the dry gas stream at an outlet of the lubrication chamber together with the lubrication fluid.

15. The method of inserting a nuclear fuel rod as in claim 14, further comprising forming two dry gas streams on either sides of the lubrication fluid stream in the lubrication chamber.

16. The method of inserting a nuclear fuel rod as in claim 6, wherein the gas of the lubricant fluid is air or inert gas and the lubricant is water, alcohol, acetone or admixture of them.

* * * * *